(12) United States Patent
Tseng et al.

(10) Patent No.: US 6,665,473 B2
(45) Date of Patent: Dec. 16, 2003

(54) COMPACT FIBER COUPLER AND METHOD OF MANUFACTURING THE SAME

(75) Inventors: Shiao-Min Tseng, No. 101, Sec. 2, Kuang-Fu Rd, Hsinchu (TW); Nan-Kuang Chen, Taipei Hsien (TW)

(73) Assignee: Shiao-Min Tseng, Hsinchu (TW)

( * ) Notice: Subject to any disclaimer, the term of this patent is extended or adjusted under 35 U.S.C. 154(b) by 56 days.

(21) Appl. No.: 09/986,385

(22) Filed: Nov. 8, 2001

(65) Prior Publication Data

US 2003/0012503 A1 Jan. 16, 2003

(30) Foreign Application Priority Data

Jul. 10, 2001 (TW) .................................... 90116838 A (51) Int. Cl.$^7$ ................................................ G02B 6/26
(52) U.S. Cl. ............................ 385/39; 385/42; 385/37; 385/50; 65/406; 65/409; 65/410
(58) Field of Search .......................... 385/39, 42, 46, 385/47, 85, 96, 97; 65/406, 409, 410

(56) References Cited

U.S. PATENT DOCUMENTS

| | | | | |
|---|---|---|---|---|
| 4,738,511 A | * | 4/1988 | Fling | 385/30 |
| 4,923,268 A | * | 5/1990 | Xu | 385/42 |
| 4,997,282 A | * | 3/1991 | Pavath | 356/350 |
| 5,029,961 A | * | 7/1991 | Suzuki et al. | 385/50 |
| 5,778,119 A | * | 7/1998 | Farries | 385/37 |
| 6,038,359 A | * | 3/2000 | Moslehi et al. | 385/42 |
| 6,453,094 B1 | * | 9/2002 | Yue | 385/37 |
| 2001/0017962 A1 | * | 8/2001 | Kim et al. | 385/43 |

* cited by examiner

*Primary Examiner*—Brian Healy
*Assistant Examiner*—Kevin S Wood
(74) *Attorney, Agent, or Firm*—Birch, Stewart, Kolasch & Birch, LLP (57) ABSTRACT

A method of manufacturing a compact fiber coupler. On a semiconductor substrate, a V-groove with a radius curvature R is formed. Then, a glue is positioned at both sides of the V-groove, and the glue is absorbed from both sides of the V-groove by capillarity. A first optical fiber and a second optical fiber are respectively fixed in the V-groove so that the cladding of the first optical fiber and the second optical fiber can be polished to form a first side-polished region and a second side-polished region. Thus, the compact fiber coupler is accomplished by aligning and fusing the first side-polished region and the second side-polished region together, in which a coupling region is formed between the first side-polished region and the second side-polished region.

18 Claims, 10 Drawing Sheets

COMPACT FIBER COUPLER AND METHOD OF MANUFACTURING THE SAME

BACKGROUND OF THE INVENTION

1. Field of the Invention

The invention relates to a compact fiber coupler, and more particularly, to a polished fiber coupler without polishing substrates, and method of manufacturing the same.

2. Description of the Related Art

In optical communication systems, some or all of the signals/light beams transmitted in one optical fiber are usually coupled into another optical fiber. Furthermore, the signals/light beams with different frequencies were coupled or separated into another optical fiber. According to the disclosed literature and prior art, four kinds of optical devices have been successively commercialized. They are (1) planar light-wave circuit (referred to PLC) [M. K. Smit and C. V. Dam, "PHASAR-Based WDM-Devices: Principles, Design and Applications," IEEE. Journal of Selected Topics in Quantum Electronics, vol. 2, pp. 236–250, June 1996.]; (2) micromachining optoelectronic system [M. C. Wu, "Micromachining for optical and optoelectronic system," Proceedings of the IEEE., vol. 85, pp. 1833–1856, November 1997.]; (3) integration of the optical fiber and micro-optics [B. Lawrence and M. Shimazu, "Waveguide Amplifiers Bring Integration Benefits," WDM Solutions, pp. 29–31, November 2000.]; and (4) all-fiber optics [referred to the web-site of Gould Fiber Optics company].

The functions, properties, prices and fabrication methods of the four kinds of optical devices mentioned above are obviously different from each other. The first and second optical devices have the disadvantage of high cost. The third optical device has the disadvantages of high production costs and yield bottleneck. The fourth optical device does not have the problems mentioned above.

Figure 1:
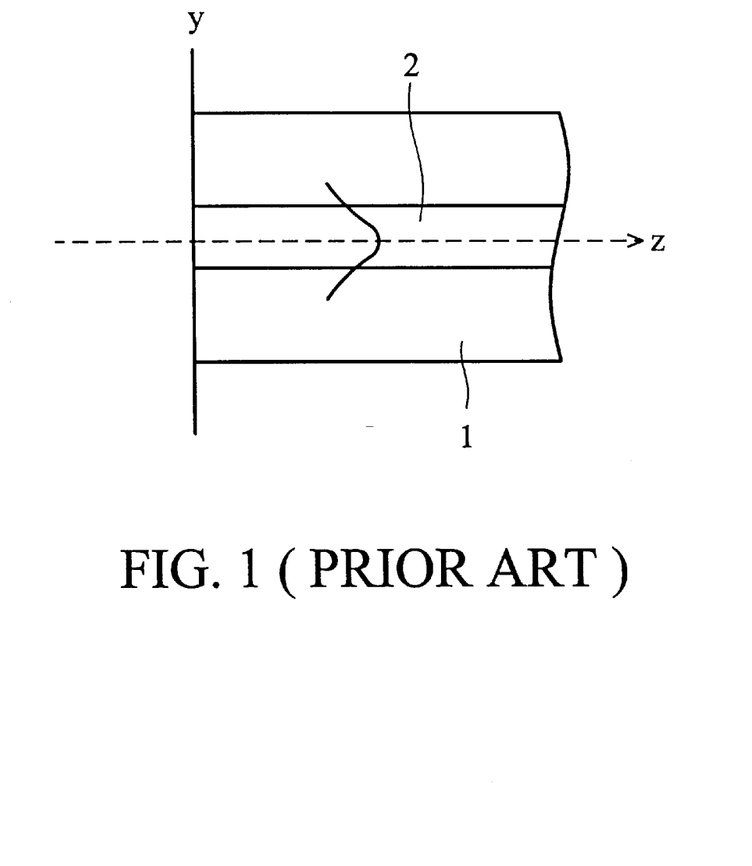
FIG. 1 schematically shows the evanescent field in an optical fiber.

The principal of the all-fiber is the theory of evanescent-coupling mechanism. As shown in FIG. 1, the evanescent field appears at the cladding portion 1, and the intensity of the evanescent field exponentially decays from the edge of the core 2. The power of the evanescent field, a decayed constant, is about the inverse of the wavelength. Therefore, at the cladding portion 1 near the edge of the core 2, the intensity of the evanescent field is very weak. In order to use the evanescent field in the optical fiber, the shape of the optical fiber needs to be changed. Then, two methods of fusion [refer to the web-site of Gould Fiber Optics company] and side-polished [M. Digonnet and H. J. Shaw, "Wavelength Multiplexing in Single-mode Fiber Couplers," Applied Optics, vol. 22, pp. 484–491, February 1983; and S. M. Tseng and C. L. Chen, "Side-Polished Fibers," Applied Optics, vol. 31, pp. 3438–3447, June 1992.], which let the cores of the two optical fibers approach each other, are popularly introduced.

Figure 2:
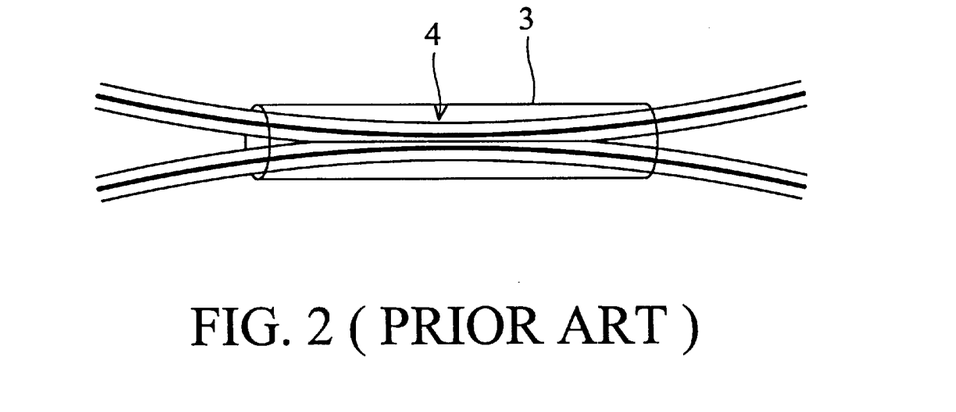
FIG. 2 schematically shows a fused coupler having a protecting component.

The process for fabricating a fused coupler consists of placing two or more optical fibers adjacent to each other, then fusing and stretching them to create a fusing-coupling region. Finally, as shown in FIG. 2, a protective component 3, such as a bear tube, packages the fusing-coupling region 4. In the fused coupler, the cross-section area and coupling length of the fusing-coupling region determine which output terminal output a signal/light beam. However, the fused coupler has a disadvantage of excessive structure variation. Further, light transmission almost disappears in the core. The fused coupler can't achieve the requirements of high-speed transmission and low loss. Because the cross-section area of the optical fiber becomes thinner and thinner during the fusing step, the signal/light beam is hard to transmit through the fusing-coupling region.

Figure 3:
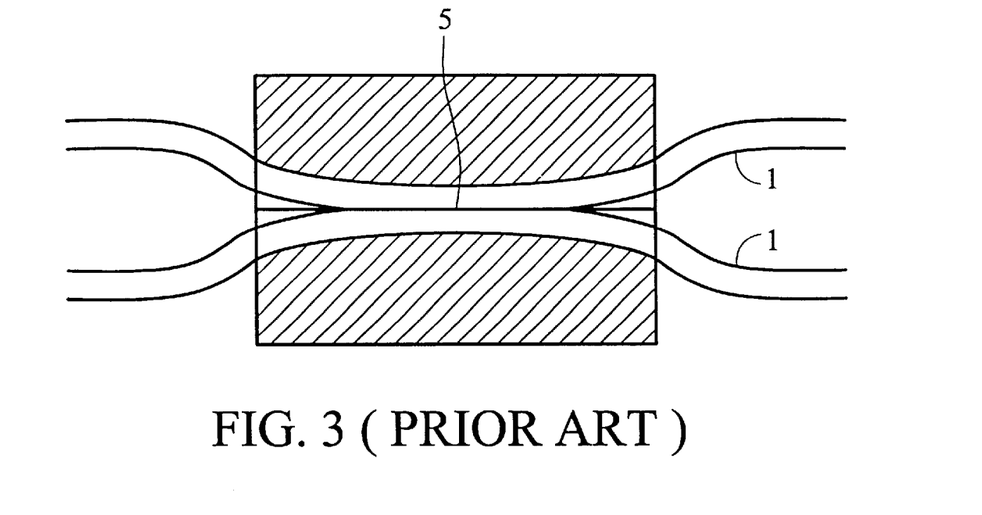
FIG. 3 schematically shows a fiber coupler with polishing substrate.

The process for fabricating side-polished fiber [S. M. Tseng and C. L. Chen, "Side-Polished Fibers," Applied Optics, vol. 31, pp. 3438–3447, June 1992.] consists of fixing an optical fiber in the groove of a polishing substrate, then creating the side-polished coupling region by polishing the cladding portion nearly to the edge of the core. Next, as shown in FIG. 3, a side-polished fiber coupler [M. Digonnet and H. J. Shaw, "Wavelength Multiplexing in Single-mode Fiber Couplers," Applied Optics, vol. 22, pp. 484–491, February 1983; and R.O.C. Patent No. 090825 by S. M. Tseng and S. P. Mar.] is formed by adjusting and adhering the side-polished coupling regions 5 of the side-polished fibers together.

In the side-polished fiber coupler, the cross-section area and coupling length of the side-polished coupling region determine which output terminal output a signal/light beam. However, the side-polished fiber coupler has a polishing substrate for fixing and polishing the optical fiber to cause large volume.

Figure 4:
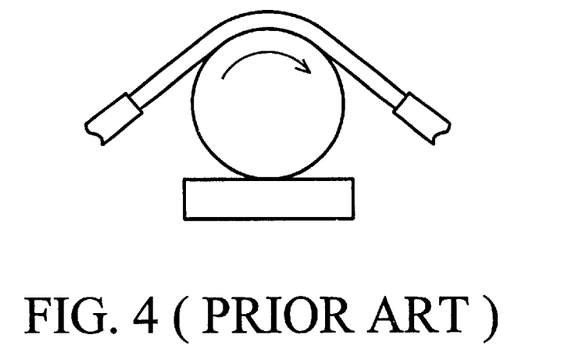
FIG. 4 schematically shows a conventional apparatus for polishing the cladding portion of the optical fiber.

As shown in FIG. 4, Hussey and Minelly [C. D. Hussey and J. D. Minelly, "Optical Fiber Polishing With a Motor-Driven Polishing Wheel," Electronics Letters, vol. 24, pp. 805–807, June 1988] provide another polishing method to reduce the volume and the time for polishing optical fiber. Next, Cryan and Hussey [C. V. Cryan and C. D. Hussey, "Fused Polished Single-Mode Fiber Couplers," Electronics Letter, vol. 28, pp. 204–205, January 1992.] provide another method for fabricating the fiber coupler by fusing two or more side-polished fibers. This fiber coupler has an advantage of small volume, but still has the disadvantage of polishing losses.

SUMMARY OF THE INVENTION

To solve the above problems, it is an object of the present invention to provide a compact fiber coupler that is applied to WDM and DWDM.

A feature of the invention is to provide a polishing substrate with a V-groove by utilizing standard microelectronic techniques and chemical etching. This process can adjust the radius curvature and depth of the V-groove, and the V-groove of the polishing substrate is used to fix and polish the optical fiber.

Another feature of the invention is to employ an optical fiber with a Bragg grating. Because of multiple reflection, the invention can obtain the advantage of low losses.

Another feature of the invention is to provide a polishing substrate with or without a lot of the same V-grooves by utilizing standard microelectronic techniques and chemical etching. A plurality of side-polished fibers are made up at the same time by polishing a plurality of optical fibers fixing therein.

Another feature of the invention is to obtain the side-polished fiber without polishing substrate by utilizing the organic solvent and corrosive liquid to remove it.

Another feature of the invention is to obtain the compact fiber coupler by fusing two or more side-polished fibers together.

The invention has an advantage of removing the mechanical stress remaining on the cladding by heating.

The invention has another advantage of obtaining a compact fiber coupler with small volume.

BRIEF DESCRIPTION OF THE DRAWINGS

This and other objects and features of the invention will become clear from the following description, taken in conjunction with the preferred embodiments with reference to the drawings, in which.

DETAILED DESCRIPTION OF THE PREFERRED EMBODIMENTS

The conventional side-polished fiber method utilizes the quartz or glass as a polishing substrate, but this method has the disadvantages of low yield and high polishing losses. Therefore, it is hard to manufacture a side-polished fiber coupler having good coupling region [M. Digonnet and H. J. Shaw, "Wavelength Multiplexing in Single-mode Fiber Couplers," Applied Optics, vol. 22, pp. 484–491, February 1983.]. In the invention, the quartz and glass are replaced with the semiconductor substrate, and then the optical fibers are fixed therein and the claddings of the optical fibers are polished. The invention successively provides a side-polished fiber with extraordinary low polishing losses, and it is easy to carry out the invention.

First Embodiment

The manufacturing method of the embodiment of the invention uses crystal orientation material, such as (100)-oriented silicon wafer of the semiconductor substrate, as the polishing substrate.

Figure 5:
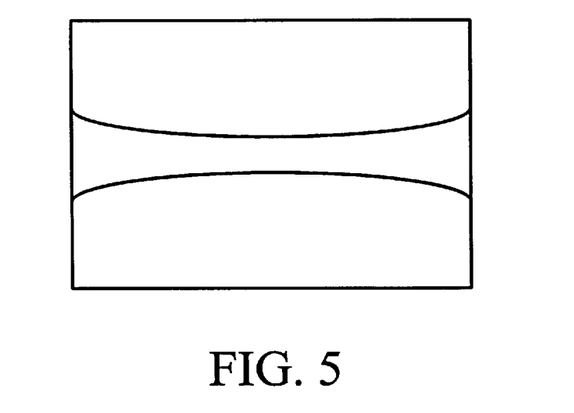
FIG. 5 schematically shows a pattern of a mask for forming a V-groove.

FIG. 5 schematically shows a mask pattern having a line for forming a V-groove, wherein the width of the line is narrow in the intermediate zone and wide at both sides. The mask pattern 20 is transferred to a Si wafer by photolithography, so that the Si wafer forms a line pattern, which is also narrow in the intermediate zone and wide at both sides. In the embodiment, it is preferred to transfer the mask pattern on the plane (100) of the Si substrate.

Figure 6A:
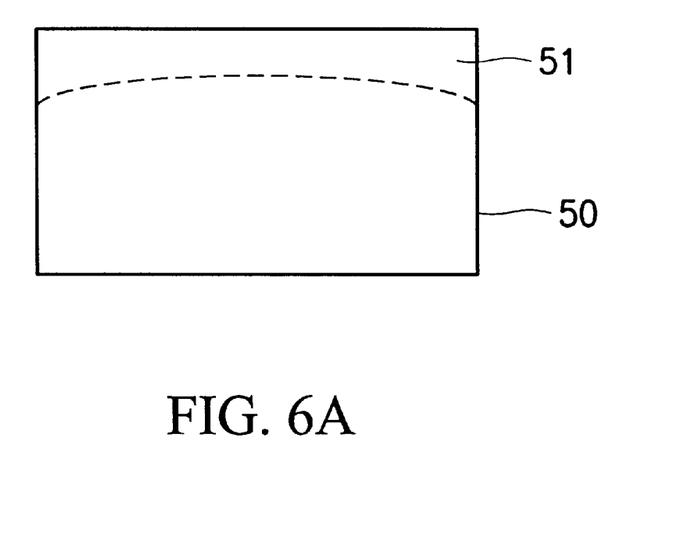
FIG. 6A is a longitudinal section of the Si substrate of the invention.
Figure 6B:
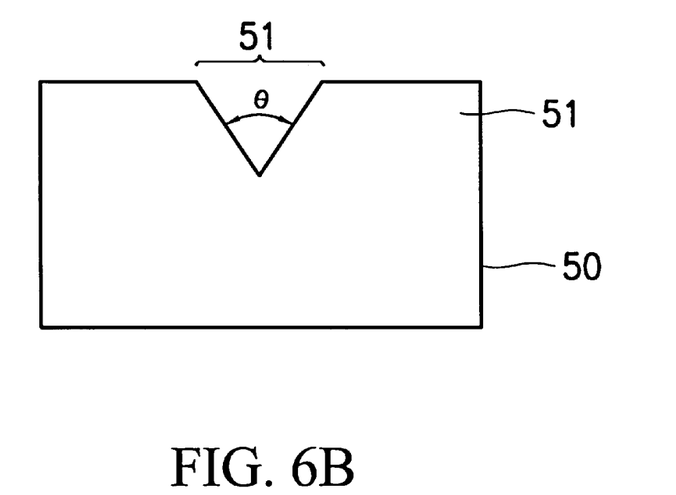
FIG. 6B is a cross-section of the Si substrate of the invention.

FIG. 6A is a longitudinal section of the Si substrate of the invention, and FIG. 6B is a cross-section of the Si substrate of the invention. Next, a V-groove 51 with a radius curvature R forms on the Si substrate 50 by anisotropic etching. Referring to FIG. 6A, a V-groove 51 with a long radius curvature R, such as R=1000 cm, is precisely formed on Si substrate 50. Referring to FIG. 6B, a V-groove 51 has an included angle $\theta=70.53°$. Moreover, a plurality of V-grooves, which may or not have the same specification, are formed simultaneously by photolithography.

Figure 7:
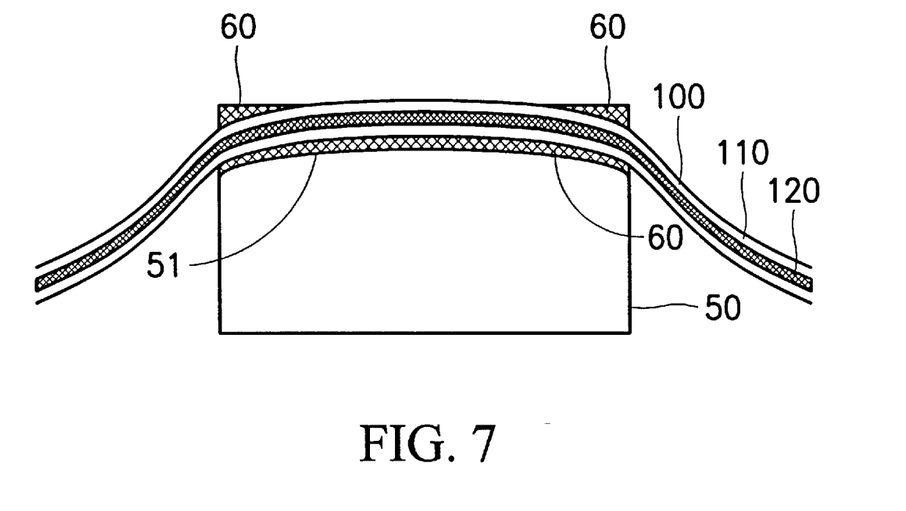
FIG. 7 is a longitudinally perspective view showing the optical fiber located in the V-groove.

FIG. 7 is a longitudinal perspective showing the optical fiber located in the V-groove. The glue 60 is positioned at both sides of the V-groove 51, and then the V-groove 51 absorbs the glue 60 from both sides by capillarity. Thus the glue 60 can uniformly fill the V-groove 51. The glue 60 is an adhesive liquid, and the index of refraction of the glue 60 is similar to the cladding of a fiber. Next, referring to FIG. 7, an optical fiber 100 is fixed in the V-groove 51 by the glue 60. Thus, the radius curvature of the V-groove is altered to form different length of the side-polished region.

Figure 8:
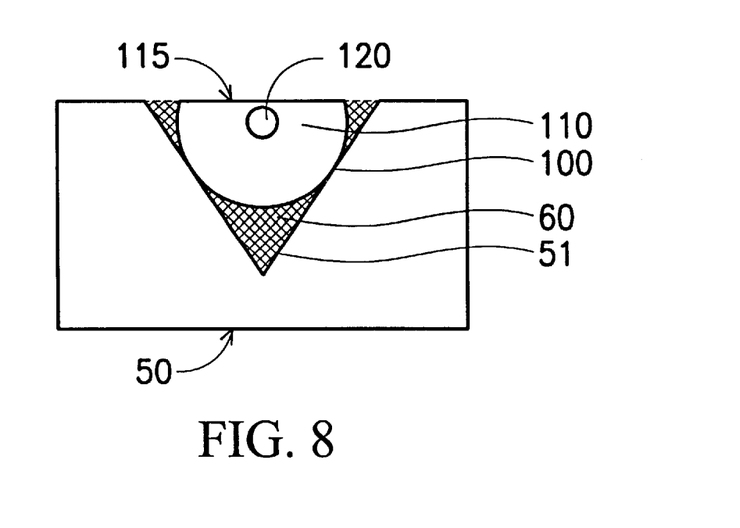
FIG. 8 is a cross-section showing the optical fiber located in the V-groove.

FIG. 8 is a cross-section showing the optical fiber located in the V-groove. Next, polishing the cladding 110 of the optical fiber 100, which projects from the V-groove 51 of the Si substrate 50, forms a side-polished region. While the side-polished region 115 of the optical fiber 100 and the surface of the Si substrate 50 have the same level, then stop polishing the cladding 110. As shown in FIG. 8, the core 120 of the optical fiber 100 is quite near the side-polished region 115.

Figure 9:
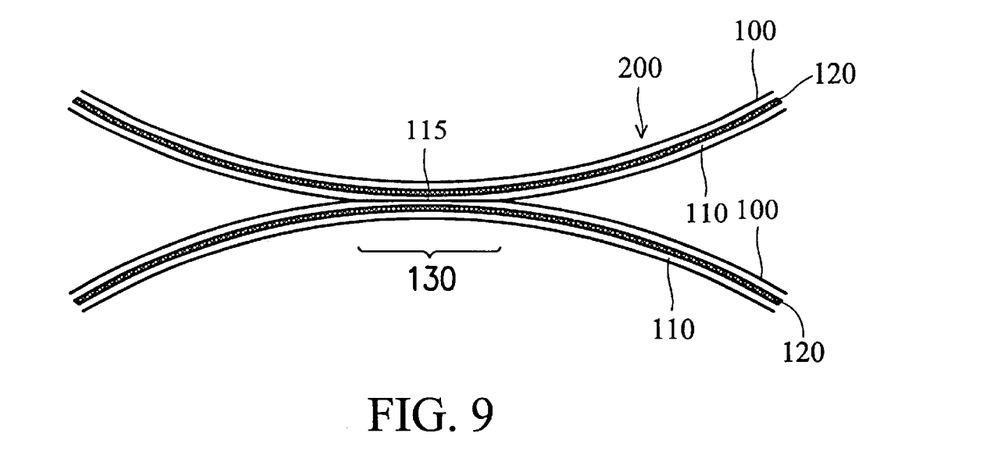
FIG. 9 schematically shows a fiber coupler formed by adhering the side-polished fibers together.

FIG. 9 schematically shows a fiber coupler formed by adhering the side-polished fibers together. The glue is dissolved in the organic solvent or corrosive liquid, such as sulfuric acid, and then the side-polished optical fiber 200 is separated from the V-groove 51 of the polishing substrate. The side-polished regions of the two optical fibers without the polishing substrates are precisely aligned, and then the claddings 110 of the two optical fibers 100 are fused together to form a coupling region. However, defects, such as the cracks and breaches, are usually formed on the side-polished region during polishing. In the invention, the defects can be removed by heating and fusing the cladding 110. Because the defects are removed, the invention can further prevent the side-polished fiber 100 from breaking. Further, an index matching liquid 70 is inserted between the interface of the side-polished region of the fused to increase the coupling efficiency. The fusing process can be selected from the group consisting of: flame, heating-wire, RF, and metal-tip discharge.

Figure 10:
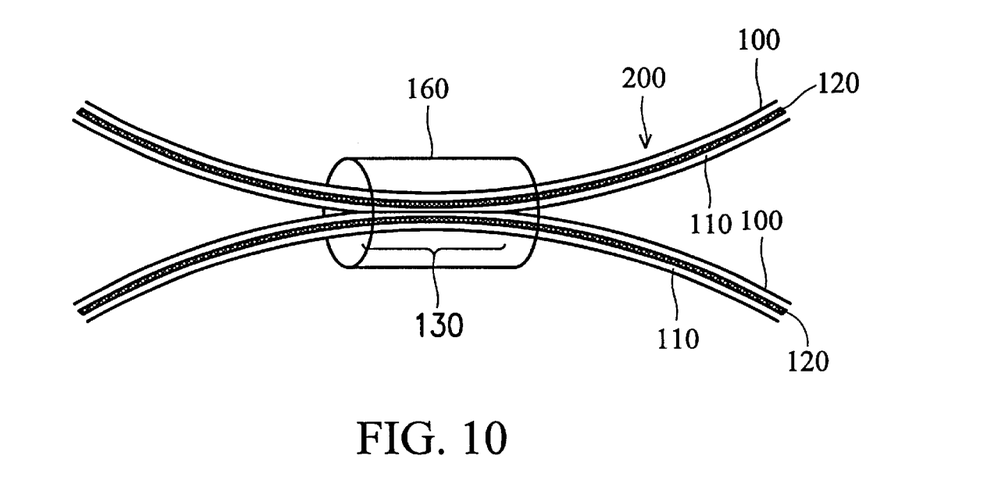
FIG. 10 schematically shows a compact fiber coupler having a bear tube.

Referring to FIG. 10, a protective means 160, such as a casing of high-polymer, metal, ceramic, glass, or a casing with the effect of temperature compensation, packages the coupling region 130. Thus, the protective means 160 further prevents the coupling region 130 from deformation and breaking.

Second Embodiment

U.S. Ser. No. 09/726,492 by Tseng et al filed Dec. 1, 2000 entitled "All-Fiber Add/Drop Filters and Method of Manufacturing the Same;" describes a fiber coupler having Bragg grating, and the contents of the preceding provisional applications are incorporated herein by reference.

Figure 11A:
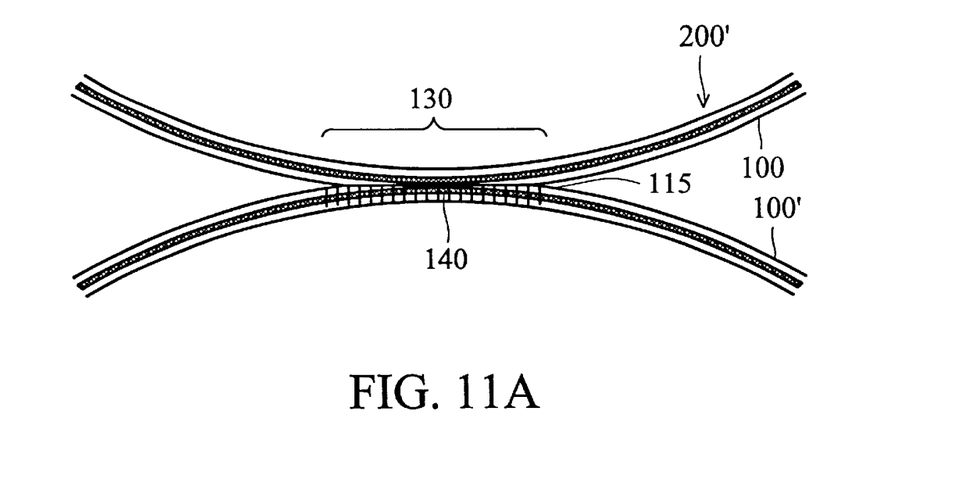
FIGS. 11A and 11B schematically show a compact fiber coupler with Bragg grating.
Figure 12A:
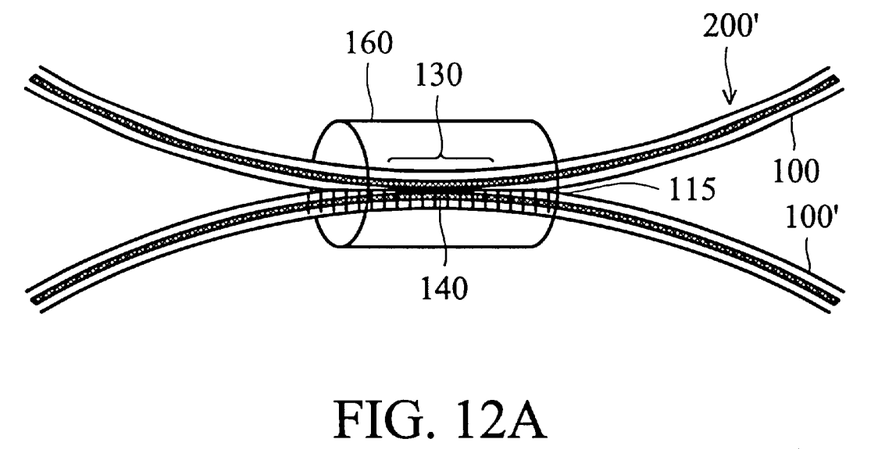
FIGS. 12A and 12B schematically show another compact fiber coupler having a bear tube.

According to the foregoing steps, a compact fiber coupler with Bragg grating is formed. Referring to FIG. 11A, an optical fiber 100' with the Bragg grating 140, that is a photosensitive fiber, and an ordinary fiber 100 are respectively fixed in the V-grooves 51, wherein the Bragg grating 140 are located in the shallow region of the V-groove 51. Next, polishing the claddings of ordinary fiber 100 and photosensitive fiber 100', which are higher than the Si substrate 50, forms the side-polished regions 115. Next, the side-polished ordinary fiber 100 and the side-polished photosensitive fiber 100' are respectively separated from the V-grooves 51 of the polishing substrate using organic solvent or corrosive liquid, such as sulfuric acid. Next, as shown in FIG. 12A, the side-polished regions 115 of the two optical fibers 100, 100' without the polishing substrates are precisely aligned, and then the two optical fibers 100, 100' are fused together to form a fiber coupler 200' with a coupling region 130. In the embodiment of the invention, the Bragg grating 140 are located in the coupling region 130.

Figure 11B:
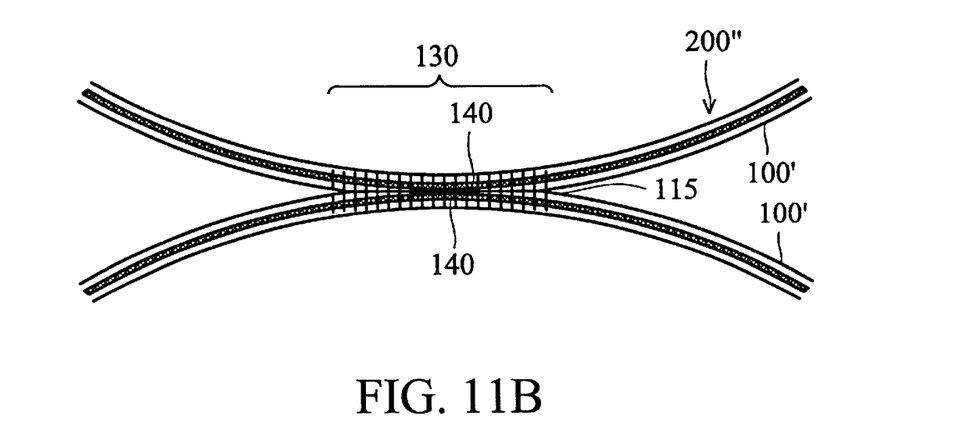
Figure 12B:
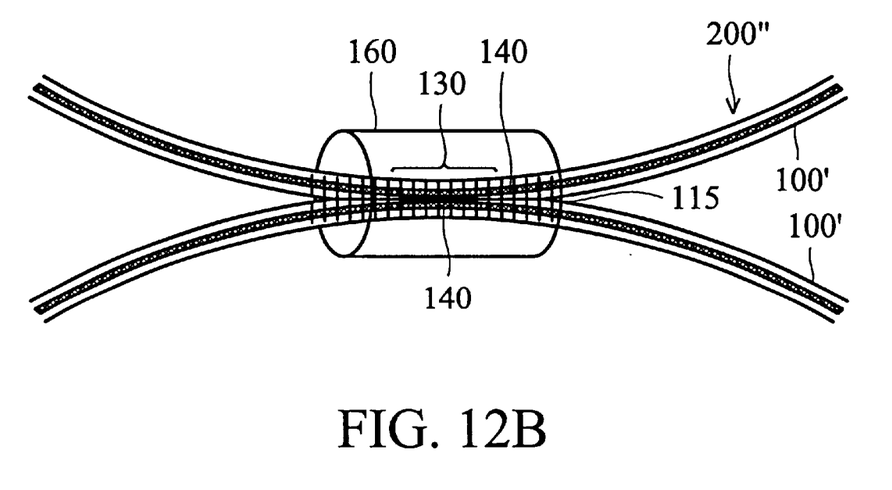

Referring to FIG. 11B, two optical fibers 100' with the Bragg grating 140, that are two photosensitive fibers, are fixed in the V-grooves 51, wherein the Bragg grating 140 are located in the shallow regions of each V-groove 51. Next, polishing the claddings of each photosensitive fiber 100', which are higher than the Si substrate 50, forms the side-polished region 115. Next, the side-polished photosensitive fibers 100' are separated from the V-grooves 51 of the polishing substrate using organic solvent or corrosive liquid, such as sulfuric acid. Next, as shown in FIG. 12B, the side-polished regions 115 of the two photosensitive fibers 100' without the polishing substrates are precisely aligned, and then the two photosensitive fibers 100' are fused together to form a fiber coupler 200'' with a coupling region 130. In the embodiment of the invention, the Bragg grating 140 are located in the coupling region 130.

As shown in FIGS. 12A and 12B, a protective means 160, such as a casing of high-polymer, metal, ceramic, glass, or a casing with the effect of temperature compensation, packages the coupling region 130. Thus, the protective means 160 further prevents the coupling region 130 from deformation and breaking.

As a broadband signal/light beam is injected in the fiber coupler, a predetermined wavelength λ of the broadband signal/light beam satisfies the Bragg relationship $$2\Lambda = m\lambda,$$

wherein Λ is the grating period and m is a positive integer, such as m=1, 2, 3, .... Thus, the predetermined wavelength λ is selectively dropped from the broadband signal/light beam.

Figure 13A:
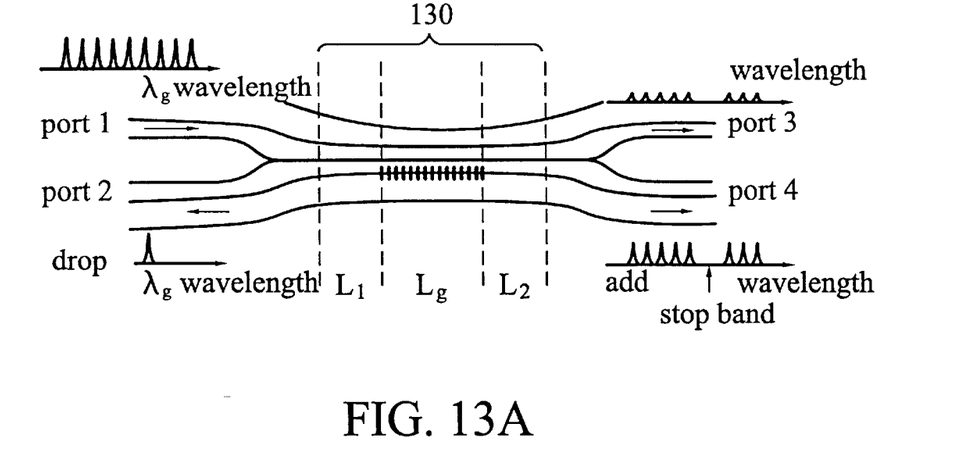
FIGS. 13A and 13B respectively show the add/drop mode of the compact fiber coupler.
Figure 13B:
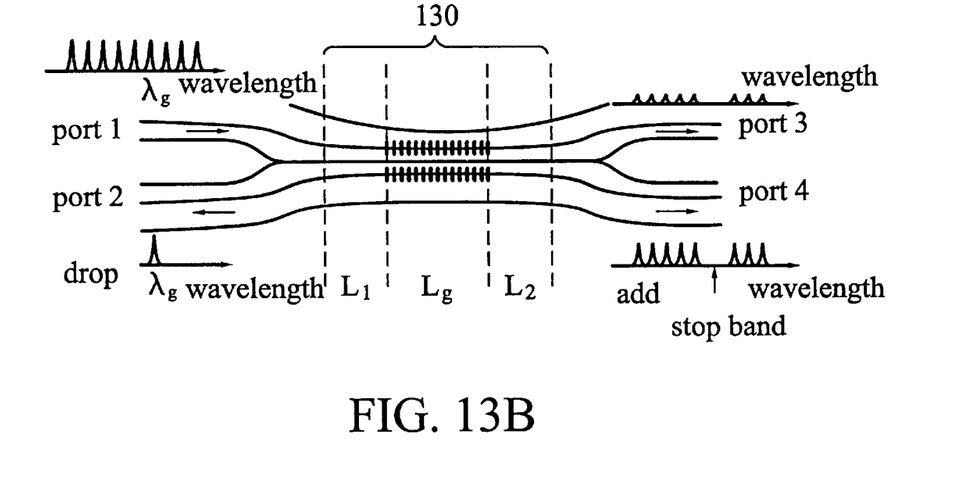

As shown in FIGS. 13A and 13B, the port 1 is an input port and a broadband light is injected into the port 1 of the optical fiber 1. After the light propagates through the coupling region, it may be exported from the port 3 of the optical fiber 1 or the port 4 of the optical fiber 2. The Bragg wavelength $\lambda_g$ included in the broadband light satisfies the Bragg relationship and is in phase to create constructive interference. Next, the Bragg wavelength $\lambda_g$ is dropped at port 2 of the optical fiber 2.

In the compact fiber coupler of the second embodiment of the invention, the broadband light generates two eigen-modes at the coupling region [I. Baumann, J. Seifert, W. Nowak and M. Sauer, "Compact All-fiber Add-drop-multiplexer Using Fiber Bragg grating," IEEE Photonics Technol. Lett., vol. 8, pp. 1331–1333, 1996]. As the phase difference of the two eigen-modes at the coupling region is expressed below:

$$(\beta_{even} - \beta_{odd})(L_1 + L_g + L_2) - \phi_{even} + \phi_{odd} = m\pi \quad (1),$$

wherein m=1, 2, 3, ..., $\phi_{even} - \phi_{odd}$ is the phase difference caused by the Bragg grating, β is the propagation constant of each eigen-mode and has the relationship with the index of refraction; $L_1$ and $L_2$ are the lengths of the respective coupling regions without Bragg grating; and $L_g$ is the length of the coupling region with Bragg grating. When the two eigen-modes are in phase, the port 4 (m=1, 3, 5, ...) or the port 3 (m=2, 4, 6 ...) can obtain a signal of constructive interference.

Referring to equation (1), choosing the appropriate length of the coupling region determines whether the transmission light without the Bragg wavelength is exported at port 4 of the optical fiber 2 or not. Thus, in the embodiment of the invention, when a signal is injected into the port 1 of the optical fiber 1, two eigen-modes are generated at the coupling region. The total length of the coupling region of the compact fiber coupler is adjusted to selectively determine the phase difference of the two eigen-modes by fusing the coupling region without the Bragg grating. In other words, after a signal is injected into the port 1 of the optical fiber 1, the total length of the coupling region of the fiber coupler is adjusted to selectively determine whether the signal is exported at port 4 of the optical fiber 2 or not by fusing the coupling region at the same time. In the second embodiment of the invention, a user can fuse any section of the coupling region in FIGS. 13A and 13B, that is non-grating coupling section $L_1$, non-grating coupling section $L_2$ or grating coupling section $L_g$.

Furthermore, referring to equations (1) and (2), the invention provides another method of selectively determining whether the signal is exported at port 4 of the optical fiber 2 by varying the index of refraction of the optical fiber by illuminating the coupling region with the UV light. In other words, after a signal is injected into the port 1 of the optical fiber 1, the index of refraction of the coupling region is adjusted to selectively determine whether the signal is exported at port 4 of the optical fiber 2 or not by illuminating the coupling region with the UV light at the same time.

Figure 14A:
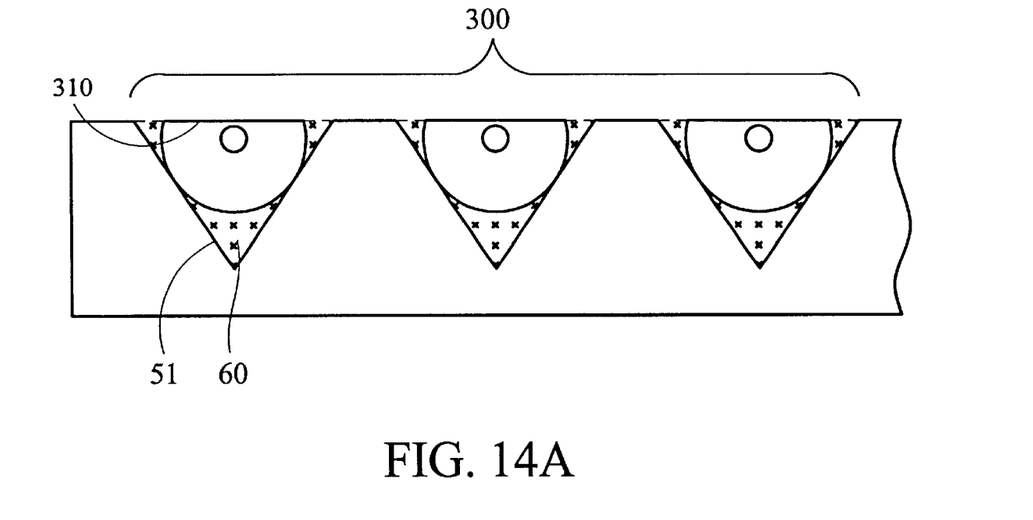
FIG. 14A schematically shows a side-polished ribbon fiber located in the V-grooves of Si substrate.
Figure 14B:
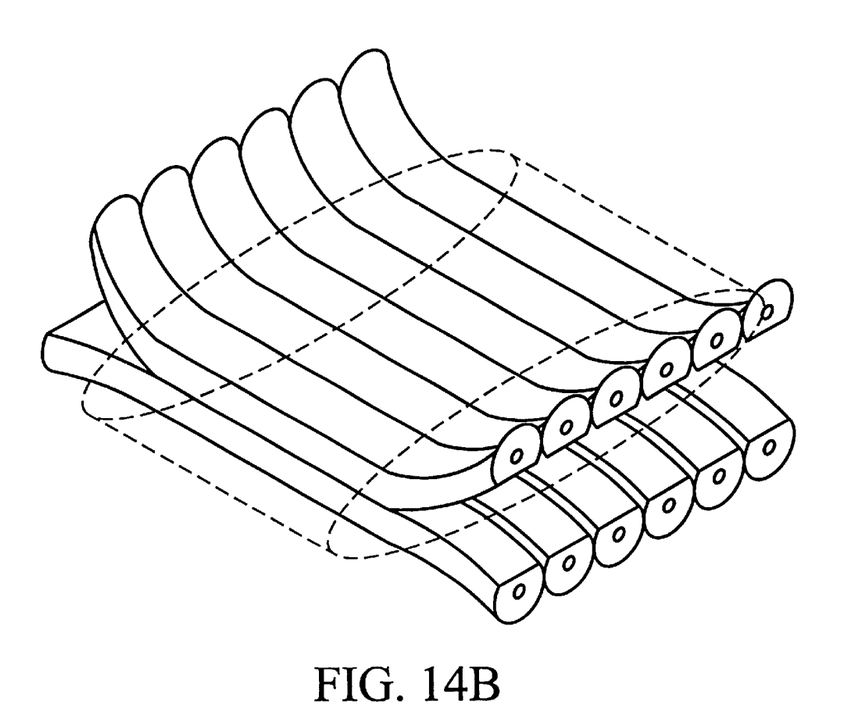
FIG. 14B schematically shows a compact ribbon fiber coupler forming by adhering the side-polished ribbon fibers together.

Referring to FIG. 14A, a plurality of V-grooves 51 corresponding to intervals of the two optical fibers of the ribbon fiber 300 are formed on the Si substrate 50. Next, the ribbon fiber 300 is fixed in the V-grooves 51 by the glue 60, and then polishing the cladding 110 of the optical fiber 100, which projects from the V-groove 51 of the Si substrate 50, forms a side-polished region. Next, the side-polished ribbon fibers 300 are separated from the V-grooves 51 of the polishing substrate 50 using organic solvent or corrosive liquid, such as sulfuric acid. Next, the side-polished regions of the two ribbon fibers 300 without the polishing substrates are precisely aligned, and then the two ribbon fibers 300 are fused together to form a compact fiber coupler with a coupling region. Finally, referring to FIG. 14B, a protective means, such as a casing of high-polymer, metal, ceramic, glass, or a casing with the effect of temperature compensation, packages the coupling region. The protective means thus prevents the coupling region from deformation and breaking.

Figure 15:
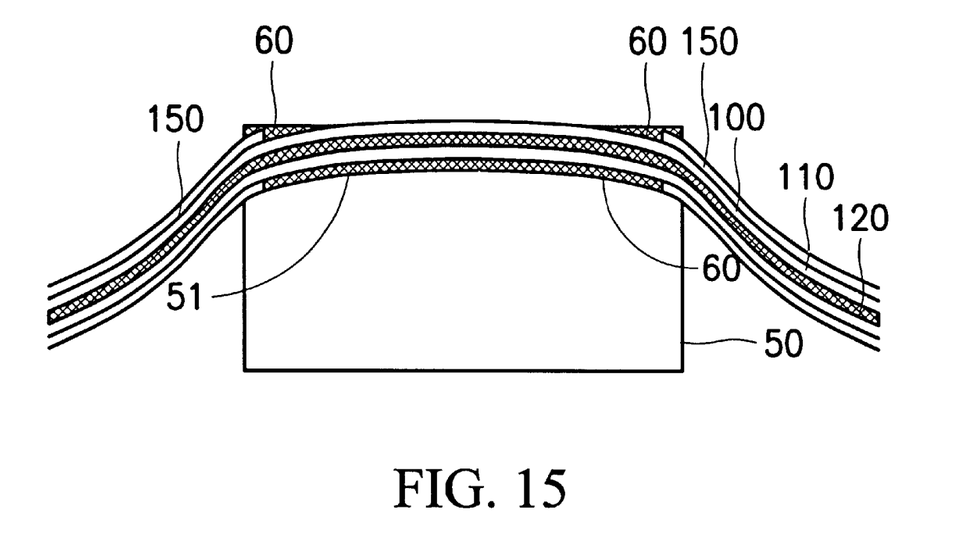
FIG. 15 schematically shows a cross-section showing the optical fiber located in the V-groove, wherein part of the jacket for protecting the cladding and core is located in two sides of the V-groove.

FIG. 15 schematically shows a cross-section showing the optical fiber located in the V-groove, wherein part of the jacket for protecting the cladding and core is located in two sides of the V-groove. Referring to FIG. 15, as part of the jacket is located in two sides of the V-groove during the process of polishing the cladding 110 of the optical fiber 100, the jacket can prevent the side-polished region from breaking.

In the invention, after obtaining the two optical fibers without the Bragg gratings and the polishing substrates, the Bragg grating locating in the coupling region can be further formed by photolithography. In other words, after obtaining a fiber coupler without the Bragg grating, the Bragg grating is formed in the coupling region by photolithography.

In the invention, the processes of fixing and polishing using the Si substrate repeatedly fabricate a plurality of side-polished optical fibers.

In the invention, the mechanical stress remaining on the cladding of the side-polished fiber can be removed by providing with a high temperature condition.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. A method of manufacturing a compact fiber coupler, comprising the steps of:
   (i) forming a V-groove with a radius curvature R on a semiconductor substrate;
   (ii) positioning glue at both sides of the V-groove, and absorbing the glue from both sides of the V-groove by capillarity;
   (iii) fixing a first optical fiber in the V-groove;
   (iv) forming a first side-polished region by polishing the cladding of the first optical fiber, wherein the core of the first optical fiber is near the first side-polished region;
   (v) isolating the first optical fiber from the semiconductor substrate using a liquid;
   (vi) forming a second optical fiber with a second side-polished region by repeating the steps of (i) to (v); and
   (vii) creating the compact fiber coupler by aligning and fusing the first side-polished region and the second side-polished region together, wherein a coupling region is formed between the first side-polished region and the second side-polished region.

2. A method of manufacturing a compact fiber coupler as claimed in claim 1, further comprising a step of packaging the coupling region of the compact fiber coupler with a protective means.

3. A method of manufacturing the compact fiber coupler as claimed in claim 1, wherein the first optical fiber comprises a first grating locating at the coupling region, and the coupling region comprises a non-grating coupling section and a grating coupling section.

4. A method of manufacturing the compact fiber coupler as claimed in claim 1, wherein the first optical fiber comprises a first grating locating at the coupling region; and the second optical fiber comprises a second grating locating at the coupling region;
   wherein the coupling region comprises a non-grating coupling section and a grating coupling section.

5. A method of manufacturing the compact fiber coupler as claimed in claim 3, further comprising the step of forming the first grating at the coupling region of the first optical fiber by photolithography.

6. A method of manufacturing the compact fiber coupler as claimed in claim 4, further comprising the step of forming the first grating and the second grating at the coupling region by photolithography.

7. A method of manufacturing the compact fiber coupler as claimed in claim 3, further comprising the steps of:
   injecting a signal into the compact fiber coupler, wherein the signal generates two eigen-modes with a phase difference at the coupling region; and
   adjusting the total length of the coupling region of the compact fiber coupler to selectively determine the phase difference of the two eigen-modes by fusing the non-grating coupling section of the coupling region.

8. A method of manufacturing the compact fiber coupler as claimed in claim 3, further comprising the steps of:
   injecting a signal into the compact fiber coupler, wherein the signal generates two eigen-modes with a phase difference at the coupling region; and
   adjusting the total length of the coupling region of the compact fiber coupler to selectively determine the phase difference of the two eigen-modes by fusing the grating coupling section of the coupling region.

9. A method of manufacturing the compact fiber coupler as claimed in claim 4, further comprising the steps of:
   injecting a signal into the compact fiber coupler, wherein the signal generates two eigen-modes with a phase difference at the coupling region; and
   adjusting the total length of the coupling region of the compact fiber coupler to selectively determine the phase difference of the two eigen-modes by fusing the non-grating coupling section of the coupling region.

10. A method of manufacturing the compact fiber coupler as claimed in claim 4, further comprising the steps of:
    injecting a signal into the compact fiber coupler, wherein the signal generates two eigen-modes with a phase difference at the coupling region; and
    adjusting the total length of the coupling region of the compact fiber coupler to selectively determine the phase difference of the two eigen-modes by fusing the grating coupling section of the coupling region.

11. A method of manufacturing the compact fiber coupler as claimed in claim 1, further comprising the steps of:
    injecting a signal into the compact fiber coupler, wherein the signal generates two eigen-modes with a phase difference at the coupling region; and
    selectively determining the phase difference of the two eigen-modes by illuminating the coupling region with UV light.

12. A method of manufacturing the compact fiber coupler as claimed in claim 2, wherein the protective means is selected from the group consisting of: a casing made of high-polymer material, a metal casing, a ceramic casing, a glass casing, and a casing with the effect of temperature compensation.

13. A method of manufacturing the compact fiber coupler as claimed in claim 1, wherein the semiconductor substrate is a Si substrate.

14. A method of manufacturing the compact fiber coupler as claimed in claim 1, further comprising a step of inserting an index matching liquid between the first side-polished region and second side-polished region.

15. A method of manufacturing the compact fiber coupler as claimed in claim 1, wherein the liquid is selected from the group consisting of an organic solvent and a corrosive liquid.

16. A method of manufacturing the compact fiber coupler as claimed in claim 1, wherein the f using process is selected from the group consisting of flame, heating-wire, RF, and metal-tip discharge.

17. A compact fiber coupler, comprising:
    a first optical fiber manufactured by the method as claimed in claim 1, which includes a first core and a first cladding surrounding the first core, wherein the first cladding includes a first side-polished region;
    a second optical fiber manufactured by the method as claimed in claim 1, which includes a second core and a second cladding surrounding the second core, wherein the second cladding Induces second side-polished region, which aligns and fuses with the first side-polished region to form a coupling region; and a protective means, which packages the coupling region formed by the first optical fiber and the second optical fiber;

wherein the first optical fiber is a ribbon fiber.

18. A compact fiber coupler, comprising:

a first optical fiber manufactured by the method as claimed in claim 1, which includes a first core and a first cladding surrounding the first core, wherein the first cladding includes first side-polished region;

a second optical fiber manufactured by the method as claimed in claim 1, which includes a second core and a second cladding surrounding the second core, wherein the second cladding includes a second side-polished region, which aligns and fuses with the first side-polished region to form a coupling region; and a protective means, which packages the coupling region formed by the first optical fiber and the second optical fiber;

wherein the second optical fiber is a ribbon fiber.

* * * * *